United States Patent [19]

Hayasaki et al.

[11] Patent Number: 4,770,066
[45] Date of Patent: Sep. 13, 1988

[54] ENGINE BRAKE CONTROL IN AUTOMATIC TRANSMISSION

[75] Inventors: Koichi Hayasaki, Fujisawa; Kazuhiko Sugano, Yokohama, both of Japan

[73] Assignee: Nissan Motor Co., Ltd., Yokohama, Japan

[21] Appl. No.: 885,135

[22] Filed: Jul. 14, 1986

[30] Foreign Application Priority Data

Jul. 15, 1985 [JP] Japan .................. 60-154244

[51] Int. Cl.⁴ ............................ B60K 41/02
[52] U.S. Cl. ........................ 74/867; 74/865
[58] Field of Search ............ 74/865, 866, 867, 877, 74/868, 869

[56] References Cited

U.S. PATENT DOCUMENTS

| | | | |
|---|---|---|---|
| 4,103,764 | 8/1978 | Iijima | 74/865 X |
| 4,313,353 | 2/1982 | Honie | 74/865 X |
| 4,395,926 | 8/1983 | Kubo et al. | 74/869 |
| 4,501,175 | 2/1985 | Tatsumi | 74/867 X |
| 4,509,628 | 4/1985 | Junginger et al. | 192/0.094 |
| 4,513,638 | 4/1985 | Nishikawa et al. | 74/866 |
| 4,570,511 | 2/1986 | Nishimura et al. | 74/877 |
| 4,573,375 | 3/1986 | Hamada et al. | 74/865 X |
| 4,584,908 | 4/1986 | Nishikawa et al. | 74/866 |
| 4,621,545 | 11/1986 | Mohl | 74/866 |
| 4,637,278 | 1/1987 | Nishikawa et al. | 74/866 |
| 4,680,992 | 7/1987 | Hayasaki et al. | 74/869 |

Primary Examiner—Leslie A. Braun
Assistant Examiner—David Novais
Attorney, Agent, or Firm—Foley & Lardner, Schwartz, Jeffery, Schwaab, Mack, Blumenthal & Evans

[57] ABSTRACT

An engine brake control for a transmission is disclosed. The transmission includes a hydraulically operated clutch selectively establishing a drive connection between a first rotary member and a second rotary member, and a one-way clutch arranged in parallel to the hydraulically operated clutch such that when the hydraulically operated clutch is released the one-way clutch transmits forward torque from the first rotary member to the second rotary member, but interrupts transmission of reverse torque to the first rotary member from the second rotary member. When a driver demands engine brake, a manual selector valve generates an engine brake command fluid pressure. A valve includes a valve spool having a first position where the hydraulically operated clutch is connected to a drain to discharge hydraulic fluid therefrom and thus the hydraulically operated clutch is released, and a second position where the hydraulically operated clutch is connected to the manual selector valve to supply the engine brake command fluid pressure thereto and thus the hydraulically operated clutch is engaged. The valve spool is normally urged to the first position thereof, but is allowed to take the second position thereof upon detecting the coasting state of the automotive vehicle.

4 Claims, 3 Drawing Sheets

FIG. 2

| RANGE | FRICTION ELEMENT SPEED | F/C | H/C | R/C | OR/C | B/B | LR/B | FO/C | LO/C |
|---|---|---|---|---|---|---|---|---|---|
| D | 1 SPEED | O | × | × | × | × | × | O | O |
| D | 2 SPEED | O | × | × | × | O | × | O | × |
| D | 3 SPEED | O | O | × | × | × | × | O | × |
| D | 4 SPEED | O | O | × | × | O | × | × | × |
| III | 1 SPEED | O | × | × | O | × | × | × | × |
| III | 2 SPEED | O | × | × | O | O | × | × | × |
| III | 3 SPEED | O | O | × | O | × | × | × | × |
| II | 1 SPEED | O | × | × | O | × | × | × | × |
| II | 2 SPEED | O | × | × | O | O | × | × | × |
| I | 1 SPEED | O | × | × | O | × | O | × | × |
| R | REV. | × | × | O | × | × | O | × | × |
| P, N | | × | × | × | × | × | × | × | × |

ENGINE BRAKE CONTROL IN AUTOMATIC TRANSMISSION

COPENDING RELATED APPLICATIONS

Reference should be made to the following copending U.S. applications which have been assigned to the assignee of the present application:

U.S. application Ser. No. 885,136, filed on July 14, 1986, claiming priority on Japanese Patent Application No. 60-171866 filed on Aug. 6, 1985;

U.S. application Ser. No. 890,370, filed on July 29, 1986, claiming priority on Japanese Patent Application No. 60-166647 filed on July 30, 1985;

U.S. application Ser. No. 890,371, filed on July 29, 1986, claiming priority on Japanes Patent Application No. 60-166646 filed on July 30, 1985;

U.S. application Serial No. 893,243, filed on Aug. 5, 1986/Now U.S. Pat. No. 4,680,992 claiming priority on Japanese Patent Applications No. 60-171154 filed on Aug. 5, 1985, No. 60-171865 filed on Aug. 6, 1985, No. 60-171869 filed on Aug. 6, 1985, and No. 60-197078 filed on Sept. 6, 1985;

U.S. application Ser. No. 905,078, filed on Sept. 9, 1986, claiming priority on Japanese Patent Applications No. 60-199318 filed on Sept. 11, 1985, and No. 60-199319 filed on Sept. 11, 1985.

BACKGROUND OF THE INVENTION

The present invention relates to an engine braking control in an automatic transmission.

Automatic transmissions effect a shift between gears by change-over in power delivery path after selective actuation of one or ones of various kinds of friction elements. It is the commonly employed practice to provide a one-way clutch which serves as a reaction member against a rotary member to establish a power delivery path.

With this one-way clutch, if the rotary member is subject to reverse torque, the one-way clutch is released to interrupt the transmission of this reverse torque. However, since the one-way clutch interrupts the transmission of reverse torque, no effective engine braking results.

Thus, a known automatic transmission is provided with a friction element which is arranged in parallel to a one-way clutch such that the friction element is activated to effect engine braking when a driver places a manual selector valve at a predetermined range position.

The engine braking control of this kind is employed for example in a THM-700 type transmission manufactured by General Motors Corporation. In this transmission, when a dirver places a manual selector valve to "III" or "II" or "I" drive range for effective engine braking in the speed range selected, a friction element (i.e., an overrunning clutch) is activated by a range pressure such as "III" range pressure or "II" range pressure or "I" range pressure, thus effecting engine braking during running in the corresponding drive range.

According to this known transmission, the friction element provided for effecting engine braking is kept activated since the driver placed the manual selector valve at one of the drive ranges. Thus, under this condition, if the driver manipulates the accelerator pedal such that depression degree frequently, the transmission of reverse torque is not interrupted so that occurrence of shocks, noises and vibrations is caused by the transmission of reverse torque. Since the transmission of reverse torque is not interrupted, if such reverse torque results for shifting operation, so-called shift shocks due to the reverse torque will take place.

An object of the present invention is to provide an engine braking control in an automatic transmission which is free from the above mentioned problems.

SUMMARY OF THE INVENTION

According to the present invention, a friction element which is arranged in parallel to a one-way clutch is activated for effecting engine braking only when a vehicle is coasting. When the coasting state is detected, this friction element is allowed to be activated.

More specifically, there is provided according to the present invention an engine braking control for a transmission for an automotive vehicle having an engine. The transmission includes an input member drivingly coupled to the engine and an output member subject to load from driving wheels of the automotive vehicle. It also includes a first rotary member, a second rotary member, a friction element serving to establish a drive connection between the first rotary member and the second rotary member, and a one-way clutch arranged in parallel to the friction element such that when the friction element is released the one-way clutch transmits forward torque from the first rotary member to the second rotary member, but interrupts transmission of reverse torque to the first rotary member from the second rotary member. The engine braking control comprises:

means for detecting coasting state of the automotive vehicle; and means responsive to the detection of coasting state by said detecting means for activating the friction element only when the automotive vehicle is coasting.

BRIEF DESCRIPTION OF THE DRAWINGS

FIG. 2 illustrates the pattern of engagement and disengagement of the various friction elements in different speeds of the transmission shown in FIG. 1;

DESCRIPTION OF THE EMBODIMENTS

Figure 1:
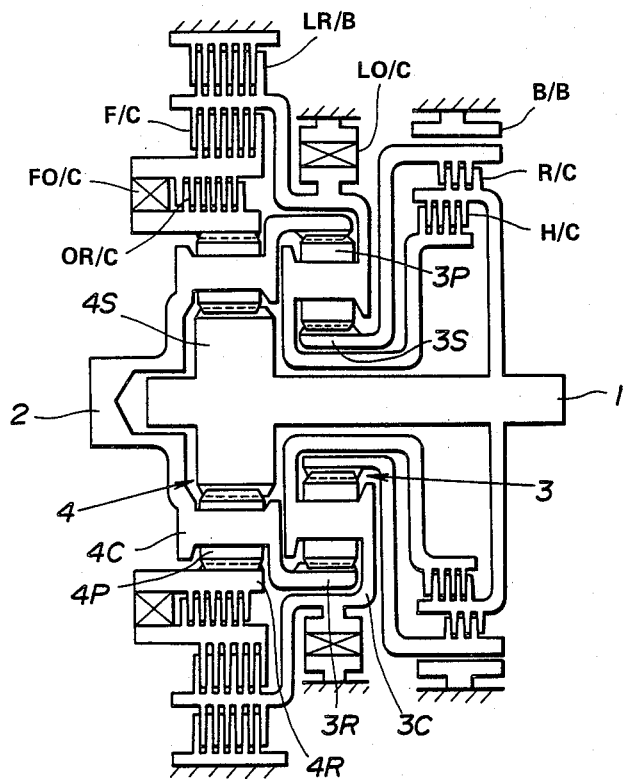
FIG. 1 is a schematic view of a transmission.

Referring to FIG. 1, the transmission illustrated herein is described in U.S. application Ser. No. 885,136 claiming priority on Japanese Patent Application No. 60-171866 filed on Aug. 6, 1985. This U.S. application concurrently filed with the present application and commonly assigned to the same assignee of the present application has been incorporated by reference in its entirety. Referring to FIG. 2, friction elements which are to be activated or engaged are denoted by the reference character o, while friction elements which are not activated or released are denoted by the reference character x. FIG. 2 shows the pattern of engagement and disengagement of the various friction elements in different speeds of the transmission shown in FIG. 1.

Figure 3:
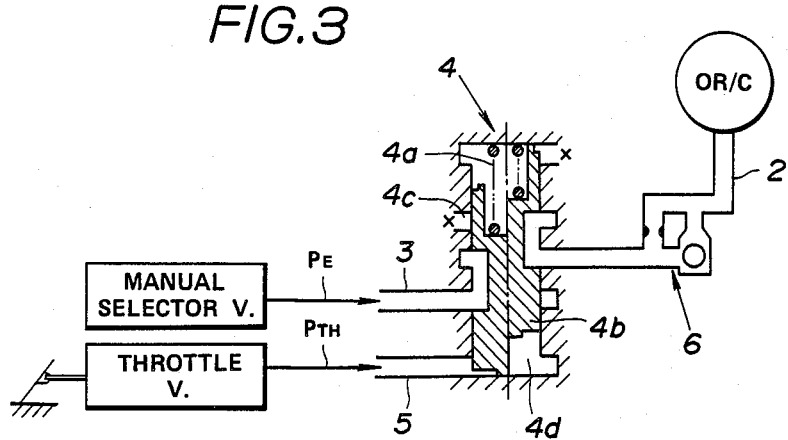
FIG. 3 is a diagram showing one embodiment of an engine brake control according to the present invention.

Referring to FIG. 3, there is diagrammatically shown, as a friction element, an overrunning clutch OR/C which is arranged in parallel to a forward one-way clutch FO/C in the automatic transmission shown in FIG. 1 and which is adapted to effect engine brake when it is activated by application of hydraulic pressure from a circuit 2.

A change-over valve 4, often referred to as an overrunning clutch control vlave, is provided which is designed as to allow application of engine brake command pressrue $P_E$ to overrunning clutch OR/C through circuit 2 during coasting of an automotive vehicle. As is well known, such engine brake command pressure is generated by a manually operable selector valve of an automatic transmission when the selector valve is placed at a predetermined drive range position, such as II range. In this embodiment, engine brake command pressure is supplied to a circuit 3. A well known throttle pressure $P_{TH}$ which varies with depression of an accelerator pedal, not shown, is supplied to a circuit 5.

Change-over valve 4 comprises a valve spool 4b slidably disposed in a valve bore. Valve spool 4b is biased by a spring 4a and has a spring set position as illustrated by a left half thereof in FIG. 3 where circuit 2 is permitted to communicate with circuit 3 so as to allow application of engine brake command pressure $P_E$ to overrunning clutch OR/C. It is movable to another position as illustrated by a right half thereof where circuit 2 is prevented from communicating with circuit 3 and now permitted to communicate with a drain port 4c, so as to prevent the application of engine braking command pressure $P_E$ and discharge hydraulic fluid from circuit 2, thus releasing overrunning clutch OR/C. Valve spool 4b is urged against spring 4a by throttle pressure $P_{Th}$ supplied to a bias chamber 4d through circuit 5. the setting of spring 4a is such that valve spool 4b assumes the position as illustrated by right half thereof while throttle pressure $P_{TH}$ stays higher than a predetermined level in response to depression degree of the accelerator pedal greater than a predetermined degree, so that valve spool 4b assumes the spring set position as illustrated by the left half thereof when the accelerator pedal is released to allow the vehicle to begin coasting. Thus, it will be appreciated that change-over valve 4 serves as a device to detect coasting state of the vehicle.

One-way orifice 6 is provided in circuit 2. The provision of one-way orifice 6 is to alleviate shocks taking place upon application of hydraulic pressure to overrunning clutch OR/C by effecting gradual rise in pressure and to discharge hydraulic fluid from overrunning clutch OR/C at a fast rate to assure release of engine braking without any delay.

The operation of the previously described embodiment is hereinafter explained.

Engine braking command pressure $P_E$ is generated and supplied to circuit 3 when a driver places the manual selector valve to the predetermined range position or he/she presses an overdrive (OD) inhibitor switch. If, under this condition, the accelerator pedal is depressed less than the predetermined degree for the vehicle to keep coasting, throttle pressure $P_{TH}$ supplied to bias chamber 4d is low and not high enough to keep valve spool 4b at the poisition as illustrated by the right half thereof against spring 4a, thus allowing spring 4a to set valve spool 4b to the position as illustrated by the left half thereof. In this position of valve spool 4b, engine brake command pressure $P_E$ is delivered through circuit 2 to overrunning clutch OR/C, activating the same to effect engine braking.

During so-called power-on state when the vehicle travels with the accelerator pedal depressed greater than the predetermined degree, throttle pressure $P_{TH}$ sufficiently high enough to maintain valve spool 4b at the position as illustrated by the right half thereof is supplied to bias chamber 4d through circuit 5. Thus, under this condition, circuit 2 is connected to drain port 4c, discharging hydraulic fluid from overrunning OR/C, thus releasing engine braking. As a result, even if the driver manipulates the accelerator pedal such that depression degree varies frequently, the transmission of reverse torque is interrupted by forward one-way clutch FO/C arranged in parallel to overrunning clutch OR/C that is released although forward torque is transmitted by this one-way clutch FO/C so that occurrence of shocks, noises and vibrations which otherwise would be caused by the transmission of reverse torque is prevented. Since, during the power-on state, the transmission of reverse torque is interrupted, even if such reverse torque results from shifting operation, so-called shift shocks due to the transmission of reverse torque will not take place.

Although, in the embodiment shown in FIG. 3, throttle pressure $P_{TH}$ is used as a parameter on detecting coasting operation of the vehicle, a so-called line pressure may be supplied in place of the throttle pressure to biase chamber 4d of change-over valve 4 as long as the line pressure is modulated by the throttle pressure such that it rises in proportion to depression of the accelerator pedal.

Coasting operation may be detected in such a manner as described hereinafter referring to FIGS. 4 and 5.

Figure 4:
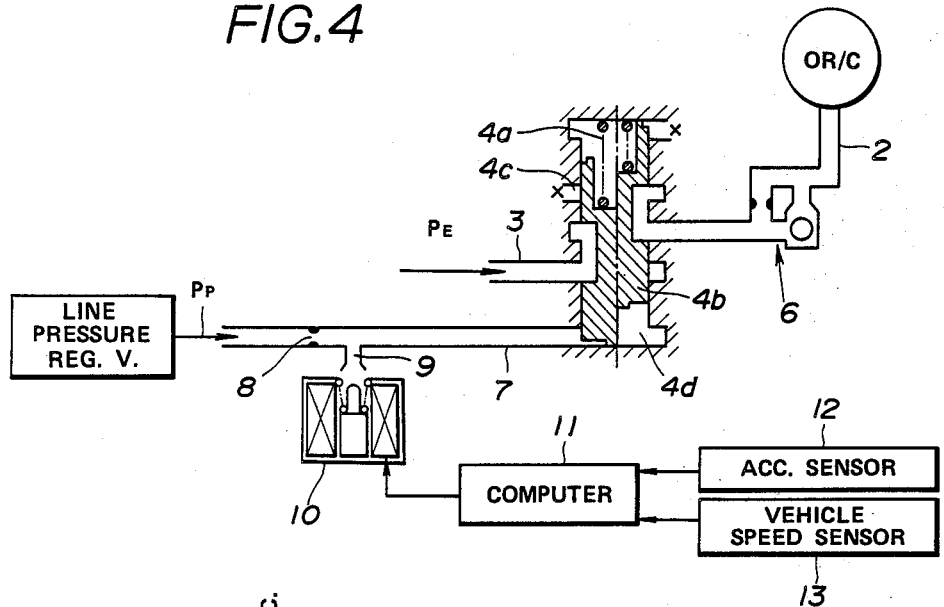
FIG. 4 is a diagram showing a second embodiment.
Figure 5:
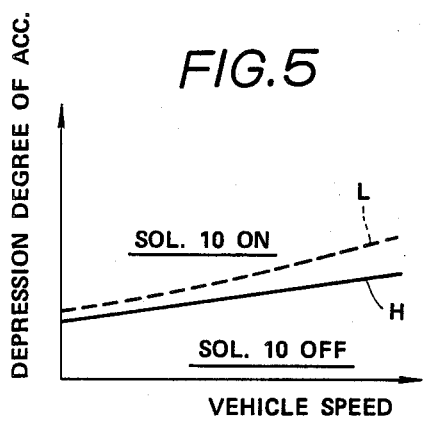
FIG. 5 is a graph showing operation of a solenoid used in FIG. 4 embodiment.

FIG. 4 shows a second embodiment according to the present invention. This embodiment is substantially the same as the first embodiment except that pressure built-up in bias chamber 4d is controlled by a pressure regulator including a source of pilot pressure $P_P$, an orifice 8, a drain portion 9, a solenoid 10 which is controlled by a computer 11 operatively coupled with an accelerator sensor 12 and a vehicle speed sensor 13. Accelerator sensor 12 generates an output signal indicative of depression degree of an accelerator pedal. Vehicle speed sensor 13 generates an output signal indicative of vehicle speed. Orifice 8 is provided in circuit 7 and drain port 9 is formed at a portion of circuit 7 between orifice 8 and bias chamber 4d. Solenoid 10 urges its plunger to close drain port 9 when it is energized due to supply of current thereto. When supply of current is cut off and solenoid 10 is deenergized, the plunger opens drain port 9. Since pilot pressure $P_P$ having a predetermined magnitude is supplied to circuit 7 on the remote side of orifice 8 from bias chamber 4d, energization of solenoid 10 causes pressure as high as pilot pressure $P_P$ to build up in bias chamber 4d because drain port 9 is closed. Deenergization of solenoid 10 causes hydraulic pressure within bias chamber 4d to drop to substantially zero.

ON/OFF (or energization/deenergization) of solenoid 10 is controlled by computer 11. Referring to FIG. 5, computer 11 is programmed such that it keeps on supplying current to solenoid 10 as long as depression degree of accelerator pedal is greater than a point on a change-over schedule line H at a vehicle speed given by vehicle speed sensor 13, but it cuts off the supply of current when the accelerator depression degree fails to be greater than the point on schedule line H. This schedule line H results from interconnecting depression degrees of accelerator pedal less than the road load line L drawn by broken line in FIG. 5.

According to this embodiment, solenoid 10 is deenergized by computer 11 in response to detection of coasting of vehicle when degree of accelerator pedal fails to be greater than the schedule line H. This causes spool 4b of change-over valve 4 to assume spring set position as illustrated by left half thereof because there exists no hydraulic pressure in bias chamber 4d, allowing application of engine brake demand pressure to overrunning clutch OR/C, thus effecting engine braking. During running of the vehicle with depression degree of accelerator pedal kept greater than schedule line H, computer 11 keeps solenoid 10 energized, allowing pilot pressure $P_P$ to develop in bias chamber 4d, causing spool 4b to assume the position as illustrated by right half thereof, discharging hydraulic fluid from circuit 2, thus releasing overrunning clutch OR/C.

What is claimed is:

1. An engine braking control for a transmission for an automotive vehicle having an engine, the transmission including an input member drivingly coupled to the engine and an output member subject to load from driving wheels of the automotive vehicle, the transmission also including a first rotary member, a second rotary member, a hydraulically operated clutch slectively establishing a drive connection between the first rotary member and the second rotary member, and a one-way clutch arranged in parallel to the hydraulically operated clutch such that when the hydraulically operated clutch is released, the one-way clutch transmits forward torque from the first rotary member to the second rotary member, but interrupts transmission of revers torque to the first rotary member from the second rotary member, said engine braking control comprising:

means for providing an engine braking command fluid pressure signal when demanded by a vehicle operator;

a valve means for normally discharging hydraulic fluid from the hydraulically operated clutch to deactivate the hydraulically operated clutch, said valve means being fluidly connected to the hydraulically operated clutch, said engine braking command fluid pressure signal providing means and a drain port, said valve means including a valve spool having a first position where the hydraulically operated clutch is allowed to communicate with said drain port to permit discharge of hydraulic fluid therefrom and thus the hydraulically operated clutch is caused to be deactivated and a second position where the hydraulically operated clutch is disconnected from said drain port and allowed to communicate with said engine braking command fluid pressure signal providing means to allow supply of said engine braking command fluid pressure signal to the hydraulically operated clutch and thus the hydraulically operated clutch is caused to be activated; and means for normally urging said valve spool to said first position thereof, but allowing said valve spool to move to said second position thereof when the automotive vehicle is coasting.

2. An engine braking control as claimed in claim 1, wherein said valve means includes a spring biasing said valve spool to said second position thereof, and wherein said valve spool defines a bias chamber in said valve means and is movable against said spring to said first position thereof in response to fluid pressure building up in said chamber.

3. An engine braking control as claimed in claim 2, wherein said normally urging means includes means for generating a throttle fluid pressure variable in response to a depression degree of an accelerator pedal of the automotive vehicle, and fluid circuit means for supplying said throttle fluid pressure to said bias chamber.

4. An engine braking control as claimed in claim 2, wherein said normally urging means includes a source of fluid pressure, fluid circuit means for connecting said bias chamber to said source of fluid pressure, said fluid circuit means including an orifice therein and a drain port opening to said fluid circuit means at a position between said orifice and said bias chamber, solenoid means for closing said drain port, an accelerator sensor means for detecting a depression degree of an accelerator pedal of the automotive vehicle and generating an output, a vehicle speed sensor means for detecting a vehicle speed of the automotive vehicle and generating an output, and means responsive to said outputs from said accelerator sensor means and said vehicle speed sensor means for engergizing said solenoid means to cause said solenoid means to close said drain port.

* * * * *